May 16, 1967  C. B. PEAR, JR  3,320,520
TEMPERATURE COMPENSATION FOR HALL EFFECT DEVICES
Filed June 4, 1964
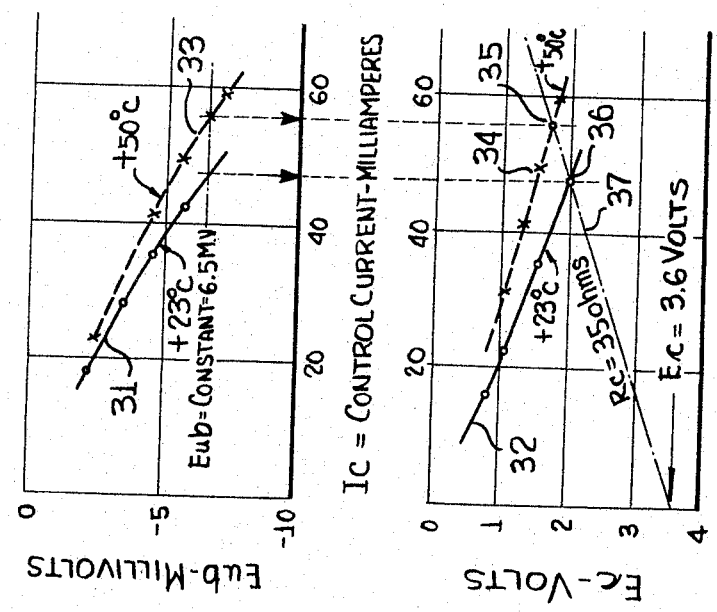
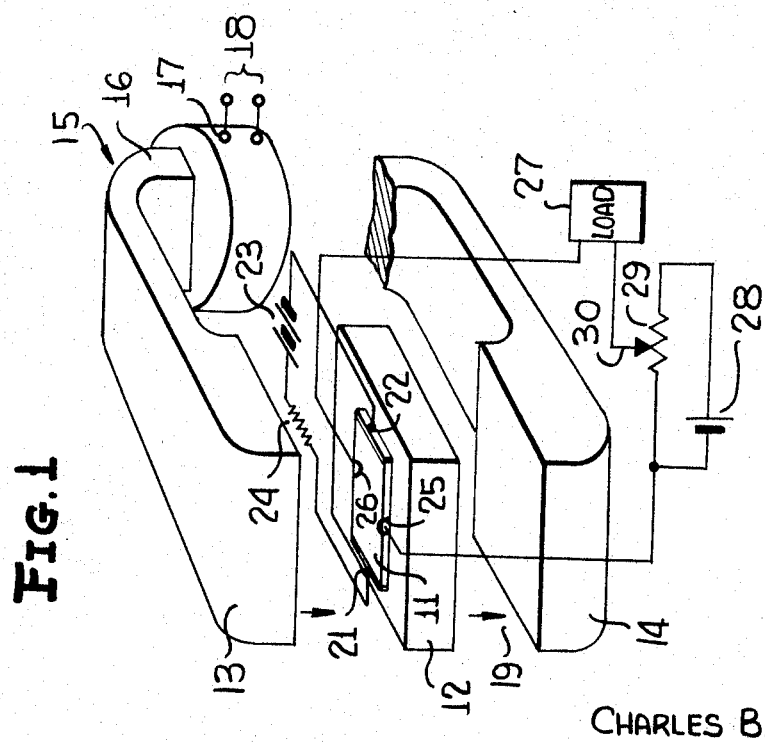
INVENTOR
CHARLES B. PEAR, Jr.
BY Hurvitz & Rose
ATTORNEYS

United States Patent Office 3,320,520
Patented May 16, 1967

3,320,520
TEMPERATURE COMPENSATION FOR HALL EFFECT DEVICES
Charles B. Pear, Jr., Eau Gallie, Fla., assignor to Radiation Incorporated, Melbourne, Fla., a corporation of Florida
Filed June 4, 1964, Ser. No. 372,605
5 Claims. (Cl. 323—68)

The present invention relates generally to temperature compensation of Hall effect devices and more particularly to a Hall effect device wherein an unbalance voltage generated across output terminals of the Hall plate is maintained substantially constant, despite temperature variations, by properly selecting the values of a control voltage source and impedance.

A Hall generator plate is a conductor or a semiconductor, the resistance of which might be said to vary as a function of the product of a magnetic field applied at right angles to the element and the current flowing in the element. Theoretically, the voltage across a pair of output terminals disposed along an equipotential line at right angles to the direction of current flow through the element should be zero when the magnetic field is zero. In practice, however, a small unbalance voltage is developed across the output terminals. For strong magnetic fields, on the order of kilogauss, the unbalance voltage is negligible and can be ignored. If the magnetic field is relatively weak, a hundred gauss or less, compensation must be provided for the unbalance voltage to obtain accurate indications of the field magnitude.

Another problem encountered is that temperature changes of many Hall plates cause variations in the unbalance voltage magnitude. Variations occur as a result of inhomogeneity in the elements which causes the output electrodes to shift in apparent position as temperature changes. Of course, such shifts cause the electrodes to effectively move with respect to the equipotentials at right angles to the control current and thus produce the unbalance changes.

In the prior art, it has been customary to provide a constant voltage in series bucking relation with the voltage unbalance across the Hall plate output terminals. The constant voltage has generally been derived by shunting a D.C. power supply across a resistive voltage divider having its tap connected to the load. Thereby, for one particular temperature, the combined voltage between the tap and one output terminal of the Hall plate is zero for magnetic fields of zero amplitude. As the temperature of the Hall plate increases and decreases, the combined voltage exceeds and drops below its zero value.

In the past, problems associated with unbalance variations caused as a result of temperature changes have been avoided by maintaining the Hall plate in a fixed temperature environment. Other solutions to the problem involved connecting thermistors, i.e. temperature responsive resistance elements, in the Hall plate control and output circuits. The temperature coefficient of resistivity of such thermistors is adjusted to compensate for Hall plate unbalance variations so that a zero magnetic field input causes zero current to flow over a wide temperature range through a load connected in circuit with the output electrodes. While the prior art approaches to the problem have generally proven satisfactory, they are relatively expensive and cause additional electrical and mechanical structure to be ulitized with the Hall plate. Also, temperature sensing thermistors and heat controlling devices are not conveniently located at a position where Hall plate temperature can be monitored accurately.

I have found that these problems of the prior art can be obviated in many cases by selecting values for the control voltage and source impedance such that a constant unbalance voltage is produced over a substantial temperature range. By properly selecting these parameters, the Hall plate, in effect, monitors its own temperature. Temperature variations are reflected as changes in Hall plate impedance, such that control current variations cancel the effect of unbalance deviations.

It is, accordingly, an object of the present invention to provide a new and improved apparatus for compensating voltage unbalance variations that occur across the output electrodes of a Hall plate with temperature changes of the plate.

Another object of the invention is to provide a Hall plate circuit wherein the plate is utilized as a temperature sensing element for varying control current so that unbalance voltage variations that normally occur with temperature changes are approximately cancelled, whereby the need for external temperature sensing elements is obviated.

A further object of the present invention is to provide a Hall effect circuit wherein unbalance voltage variations that occur as a function of temperature are substantially cancelled by properly selecting values for the voltage source and driving impedance of the control circuit.

Another object of the invention is to provide a new and improved, inexpensive, Hall effect circuit utilizing a minimum number of components wherein unbalance voltage variations that normally occur as a function of temperature are obviated.

The above and still further objects, features and advantages of the present invention will become apparent upon consideration of the following detailed description of one specific embodiment thereof, especially when taken in conjunction with the accompanying drawings, wherein:

FIGURE 1 is a perspective view of a preferred embodiment of the invention; and

FIGURES 2A and 2B are graphs illustrating characteristics of the plate of FIGURE 1.

Reference is now made to FIGURE 1 of the drawings wherein Hall plate 11, fabricated from a suitable conducting material, is positioned on insulating slab 12 in gap 19 between oppositely disposed pole pieces 13, 14 of magnetic core 15, of high permeability. Wound on leg 16 of core 15 is cylindrical coil 17 having output terminals 18 that may be connected to a suitable source to produce a magnetic field to be measured. As the voltage applied to terminals 18 varies, the magnetic field across gap 19, hence through Hall plate 11, is modulated from the null value it has with an impressed zero voltage. While the magnetic field is illustrated as being applied by coil 17, it is to be understood that it can be derived externally, such as from the earth's magnetic field.

Control current is fed to input electrodes 21, 22 of Hall plate 11 via D.C. source 23 and resistor 24, which is of usual construction and is mounted remotely from the plate so as to be unresponsive to its temperature. The current supplied to plate 11 flows at right angles to the magnetic field established in gap 19. Positioned near the centers of the edges of plate 11 parallel to the direction of current flow between input electrodes 21, 22, are output electrodes 25, 26. Theoretically, the voltage between electrodes 25, 26 is directly proportional to the product of the magnetic field directed at right angles to the face of plate 11 (the field produced in gap 19 by core 15 and coil 17) and the current flowing between electrodes 21 and 22. Because electrodes 25, 26 cannot be placed with sufficient accuracy on the edges of plate 11 there is actually a small unbalance voltage between them when there is a zero magnetic field in gap 19. To compensate for unbalance between terminals 25, 26, a bucking voltage is connected in series between electrode 25 and one terminal of load 27, the other terminal of which is directly connected to electrode 26. The bucking voltage comprises D.C. power supply 28, that is connected across potentiometer 29. For one particular temperature, potentiometer slider 30 is adjusted so there is zero voltage across load 27 when there is zero magnetic field in gap 19.

As discussed supra, in effect the impedances of Hall plate 11 vary as functions of temperature so the unbalance voltage across electrodes 25, 26 changes as temperature changes. In accordance with the present invention, the impedance of resistor 24 and voltage of source 23 are selected such that the unbalance across electrodes 25, 26 remains substantially constant over a fairly wide range of temperature variations. This is possible because plate 11 senses its own temperature and varies its impedance to maintain the unbalance voltage across electrodes 25, 26 substantially constant.

The manner by which the values for source 23 and resistor 24 are selected for a typical Hall plate may be seen by referring to the graphs of FIGURES 2A and 2B, characteristic curves for the Siemens SBV–536 indium antimonide (InSb) plates, with zero magnetic field. In FIGURE 2A, unbalance voltage (Eub) between electrodes 25 and 26 in millivolts is plotted as a function of control current, in milliamperes, while FIGURE 2B is a plot of control voltage across electrodes 21 and 22, in volts, against control current, in milliamperes. In FIGURES 2A and 2B, the voltage vs. current characteristics for +23° C. are represented by curves 31 and 32, respectively, and the characteristics for +50° C. are shown by lines 33 and 34.

The first step is to determine the desired constant, unbalance voltage between terminals 25, 26. This potential is selected such that the control current does not exceed its nominal rated value for safe dissipation in plate 11, in the example it is selected as 6.5 millivolts. A horizontal line is drawn along the selected potential; control currents commensurate with the 23° C. and 50° C. temperatures are noted on curves 31 and 33 as being approximately 47 and 56 milliamperes, respectively. Currents associated with the noted interception points are reflected to the appropriate points on FIGURE 2B. To determine the value of resistor 24, $R_c$, load line 37 is drawn through points 35 and 36 of FIGURE 2B and the slope of this line is measured as $$R_c = \frac{\Delta E}{\Delta I}$$

for the present case $R_c = 35$ ohms. The value of D.C. source 23 is derived by extending load line 37 to the point where $I_c = 0$ and observing the value of $E_c$; for the present example $E_c = 3.6$ volts. I have found that with this procedure the ascertained values of resistor 24 and source 23 compensate for unbalance voltage variations that are due to temperature change throughout the range 23° C. to 50° C., for the indium antimonide plates utilized.

It is understood that the invention is limited to Hall materials having sufficiently large temperature coefficients to warrant compensation.

While I have described and illustrated one specific embodiment of my invention, it will be clear that variations of the details of construction which are specifically illustrated and described may be resorted to without departing from the true spirit and scope of the invention as defined in the appended claims. Particularly, A.C. or pulsed control currents may be used as effectively as D.C. source 23.

I claim:
1. Apparatus for maintaining the unbalance voltage of a Hall effect plate substantially constant as the plate temperature varies within limits comprising a Hall plate, means for establishing a magnetic field at right angles to the face of said plate, means for supplying control current through said plate at right angles to said field, a pair of output electrodes on opposite sides of said plate substantially at right angles to the flow direction of said current, said plate deriving an unbalance voltage between said electrodes when said magnetic field is of zero amplitude, said unbalance voltage varying as a function of temperature, said current supplying means including resistance means in circuit with a voltage source, the impedance of said resistance means being selected to define a load line that intercepts a point on each of a pair of constant temperature curves of the current versus output voltage characteristic of said Hall plate when the magnetic field applied to the plate is zero, each of said points being associated with the same unbalance voltage for the respective temperature, the value of said source being selected at the voltage said load line intercepts the zero current line of said characteristic curve.

2. The apparatus of claim 1 further including means for deriving a voltage to buck the unbalance voltage across said output electrodes, said voltage deriving means supplying a voltage of substantially the same amplitude and of opposite polarity to said unbalance voltage.

3. The apparatus of claim 1 wherein said Hall plate is a semiconductor comprising indium antimonide.

4. Apparatus for maintaining the unbalance voltage of a Hall effect plate substantially constant as the plate tempearture varies within limits, said apparatus comprising a Hall plate, means for establishing a magnetic field at right angles to the face of said plate, means coupled to opposite ends of said plate for supplying control current through said plate at right angles to said field, a pair of output electrodes on opposite sides of said plate, said electrodes being located on a line extending across said plate substantially at right angles to the direction of flow of said current, and means for compensating the temperature induced unbalance voltage variations between said electrodes over at least a preselected range of temperatures; said compensating means including said control current supply means comprising a voltage source, electrical resistance means in series circuit with said voltage source, said resistance means having a resistance value substantially independent of temperature over at least said preselected range of temperatures, the resistance of said resistance means and the output voltage of said voltage source having values selected to produce different values of control current for different temperatures within said preselected range, each of said values of control current producing a common constant unbalance voltage between said electrodes at each temperature within said preselected range, said compensating means further including a second voltage source, and means coupling said second voltage source across said output electrodes in opposition to said common unbalance voltage for cancellation thereof.

5. The combination according to claim 4 wherein said second voltage source is variable, and said coupling means includes terminals for connection to the electrical load for said output electrodes, in series circuit with said second voltage source.

References Cited by the Examiner
UNITED STATES PATENTS
3,008,083 11/1961 Kuhrt et al.
3,267,368 8/1966 Rock et al. _____ 307—88.5

FOREIGN PATENTS
1,131,798 6/1962 Germany.
903,444 8/1962 Great Britain.

OTHER REFERENCES
Heid and Silverman, Stabilization of the Hall Effect Multiplier, Solid State Design, October 1963, pp. 17–22.

JOHN F. COUCH, *Primary Examiner.*
A. D. PELLINEN, *Assistant Examiner.*